US00RE42541E

(19) United States
(12) Reissued Patent
Dalvey et al.

(10) Patent Number: US RE42,541 E
(45) Date of Reissued Patent: Jul. 12, 2011

(54) IMAGE TRANSFER SHEET

(75) Inventors: Jody A. Dalvey, Orono, MN (US); Nabill F. Nasser, Minneapolis, MN (US)

(73) Assignee: Jodi A. Schwendimann, Plymouth, MN (US)

(21) Appl. No.: 11/054,717

(22) Filed: Feb. 9, 2005

Related U.S. Patent Documents

Reissue of:
(64) Patent No.: 6,551,692
Issued: Apr. 22, 2003
Appl. No.: 09/150,983
Filed: Sep. 10, 1998

(51) Int. Cl.
*B41M 5/50* (2006.01)

(52) U.S. Cl. ..... 428/32.12; 428/32.24
(58) Field of Classification Search ..... 428/32.12; 503/227
See application file for complete search history.

(56) References Cited

U.S. PATENT DOCUMENTS

| | | | |
|---|---|---|---|
| 3,790,439 | A | 2/1974 | La Perre et al. |
| 3,922,435 | A | 11/1975 | Asnes |
| 4,102,456 | A | 7/1978 | Morris |
| 4,169,169 | A | 9/1979 | Kitabatake |
| 4,224,358 | A | 9/1980 | Hare |

(Continued)

FOREIGN PATENT DOCUMENTS

| | | | |
|---|---|---|---|
| EP | 0466503 | | 7/1990 |
| EP | 0 466 503 | * | 10/1992 |
| EP | 0782931 | A1 | 7/1997 |
| EP | 0881092 | A2 | 12/1998 |
| EP | 0899121 | A1 | 3/1999 |
| EP | 0933225 | A1 | 8/1999 |
| GB | 2295973 | A | 6/1996 |
| JP | 63122592 | | 5/1988 |
| JP | 1037233 | | 2/1989 |
| JP | 7276833 | | 10/1995 |
| JP | 8085269 | | 4/1996 |
| WO | WO-0073570 | A1 | 12/2000 |

OTHER PUBLICATIONS

"U.S. Appl. No. 10/911,249 Response to Final Office Action filed Jan. 24, 2007", 8 pgs.
"U.S. Appl. No. 10/911,249 Response to Final Office Action filed Jan. 26, 2006", 7 pgs.
"U.S. Appl. No. 10/911,249 Response to Final Office Action filed Jan. 30, 2006", 7 pgs.
"U.S. Appl. No. 10/911,249 Response to Final Office Action filed Jul. 11, 2007", 11 pgs.
"U.S. Appl. No. 10/911,249 Response to Non–Final Office Action filed May 4, 2005", 6 pgs.

(Continued)

*Primary Examiner*—Bruce H Hess
(74) *Attorney, Agent, or Firm*—Schwegman Lundberg & Woessner, P.A.

(57) ABSTRACT

The present invention includes a method for transferring an image from one substrate to another. The method includes providing an image transfer sheet that is comprised of a substrate layer, a release layer and an image-imparting layer that may comprise a low density polyethylene or other polymeric component having a melting temperature within a range of 90°–700° C. An image is imparted to the low density polyethylene area with an image-imparting medium. A second image-receiving substrate is provided. The second image-receiving substrate is contacted to the first image transfer sheet at the polymer layer. Heat is applied to the image transfer sheet so that the low density polyethylene encapsulates the image-imparting medium and transfers the encapsulates to the image-receiving substrate, thereby forming a mirror image on the image-receiving substrate.

20 Claims, 1 Drawing Sheet

U.S. PATENT DOCUMENTS

| | | | | |
|---|---|---|---|---|
| 4,235,657 | A | | 11/1980 | Greenman et al. |
| 4,284,456 | A | | 8/1981 | Hare |
| 4,399,209 | A | | 8/1983 | Sanders et al. |
| 4,461,793 | A | | 7/1984 | Blok et al. |
| 4,548,857 | A | | 10/1985 | Galante |
| 4,549,824 | A | | 10/1985 | Sachdev et al. |
| 4,594,276 | A | | 6/1986 | Relyea |
| 4,685,984 | A | | 8/1987 | Powers et al. |
| 4,758,952 | A | | 7/1988 | Harris, Jr. et al. |
| 4,863,781 | A | | 9/1989 | Kronzer |
| 4,880,678 | A | | 11/1989 | Goffi |
| 4,966,815 | A | | 10/1990 | Hare |
| 4,980,224 | A | | 12/1990 | Hare |
| 5,019,475 | A | | 5/1991 | Higashiyama et al. |
| 5,028,028 | A | | 7/1991 | Yamada et al. |
| 5,045,383 | A | | 9/1991 | Maeda et al. |
| 5,059,580 | A | | 10/1991 | Shibata et al. |
| 5,097,861 | A | | 3/1992 | Hopkins et al. |
| 5,110,389 | A | | 5/1992 | Hiyoshi et al. |
| 5,133,819 | A | | 7/1992 | Croner |
| 5,139,917 | A | | 8/1992 | Hare |
| 5,217,793 | A | * | 6/1993 | Yamane et al. ..... 428/212 |
| 5,236,801 | A | | 8/1993 | Hare |
| 5,242,739 | A | | 9/1993 | Kronzer et al. |
| 5,252,531 | A | | 10/1993 | Yasuda et al. |
| 5,271,990 | A | | 12/1993 | Kronzer et al. |
| 5,334,439 | A | | 8/1994 | Kawaguchi et al. |
| 5,350,474 | A | | 9/1994 | Yamane |
| 5,362,703 | A | | 11/1994 | Kawasaki et al. |
| 5,372,884 | A | | 12/1994 | Abe et al. |
| 5,400,246 | A | | 3/1995 | Wilson et al. |
| 5,407,724 | A | | 4/1995 | Mimura et al. |
| 5,431,501 | A | | 7/1995 | Hale et al. |
| 5,434,598 | A | | 7/1995 | Shimomine et al. |
| 5,501,902 | A | | 3/1996 | Kronzer |
| 5,521,229 | A | | 5/1996 | Lu et al. |
| 5,614,345 | A | | 3/1997 | Gumbiowski et al. |
| 5,620,548 | A | | 4/1997 | Hare |
| 5,665,476 | A | | 9/1997 | Oez |
| 5,707,925 | A | | 1/1998 | Akada et al. |
| 5,770,268 | A | | 6/1998 | Kuo et al. |
| 5,798,161 | A | | 8/1998 | Kita et al. |
| 5,798,179 | A | | 8/1998 | Kronzer |
| 5,821,028 | A | * | 10/1998 | Maejima et al. ..... 430/201 |
| 5,833,790 | A | | 11/1998 | Hare |
| 5,861,355 | A | | 1/1999 | Olson et al. |
| 5,905,497 | A | | 5/1999 | Vaughan et al. |
| 5,917,730 | A | | 6/1999 | Rittie et al. |
| 5,925,712 | A | | 7/1999 | Kronzer |
| 5,942,335 | A | | 8/1999 | Chen et al. |
| 5,948,586 | A | | 9/1999 | Hare |
| 5,962,149 | A | | 10/1999 | Kronzer |
| 5,981,045 | A | | 11/1999 | Kuwabara et al. |
| 5,981,077 | A | | 11/1999 | Taniguchi |
| 6,017,611 | A | | 1/2000 | Cheng et al. |
| 6,033,739 | A | | 3/2000 | Kronzer |
| 6,033,824 | A | | 3/2000 | Hare et al. |
| 6,036,808 | A | | 3/2000 | Shaw-Klein et al. |
| 6,042,914 | A | | 3/2000 | Lubar |
| 6,054,223 | A | | 4/2000 | Tsuchiya et al. |
| 6,066,387 | A | | 5/2000 | Ueda et al. |
| 6,071,368 | A | | 6/2000 | Boyd et al. |
| 6,083,656 | A | | 7/2000 | Hare et al. |
| 6,087,061 | A | | 7/2000 | Hare et al. |
| 6,090,520 | A | | 7/2000 | Hare et al. |
| 6,096,475 | A | | 8/2000 | Hare et al. |
| 6,106,982 | A | | 8/2000 | Mientus et al. |
| 6,113,725 | A | | 9/2000 | Kronzer |
| 6,120,888 | A | | 9/2000 | Dolsey et al. |
| 6,139,672 | A | | 10/2000 | Sato et al. |
| 6,177,187 | B1 | | 1/2001 | Niemoller et al. |
| 6,180,256 | B1 | | 1/2001 | Sargeant |
| 6,200,668 | B1 | | 3/2001 | Kronzer |
| 6,242,082 | B1 | | 6/2001 | Mukoyoshi et al. |
| 6,245,710 | B1 | | 6/2001 | Hare et al. |
| 6,258,448 | B1 | | 7/2001 | Hare |
| 6,265,128 | B1 | | 7/2001 | Hare et al. |
| 6,294,307 | B1 | | 9/2001 | Hare et al. |
| 6,331,374 | B1 | | 12/2001 | Hare et al. |
| 6,338,932 | B2 | | 1/2002 | Hare et al. |
| 6,340,550 | B2 | | 1/2002 | Hare et al. |
| 6,358,660 | B1 | | 3/2002 | Agler et al. |
| 6,383,710 | B2 | | 5/2002 | Hare et al. |
| 6,423,466 | B2 | | 7/2002 | Hare et al. |
| 6,428,878 | B1 | | 8/2002 | Kronzer |
| 6,450,633 | B1 | | 9/2002 | Kronzer |
| 6,495,241 | B2 | | 12/2002 | Sato et al. |
| 6,497,781 | B1 | | 12/2002 | Dalvey et al. |
| 6,506,445 | B2 | | 1/2003 | Popat et al. |
| 6,509,131 | B2 | | 1/2003 | Hare et al. |
| 6,521,327 | B1 | | 2/2003 | Franke |
| 6,531,216 | B1 | | 3/2003 | Williams et al. |
| 6,539,652 | B1 | | 4/2003 | Barry |
| 6,551,692 | B1 | | 4/2003 | Dalvey et al. |
| 6,582,803 | B2 | | 6/2003 | Cole et al. |
| 6,638,604 | B1 | | 10/2003 | Bamberg et al. |
| 6,638,682 | B2 | | 10/2003 | Hare et al. |
| 6,667,093 | B2 | | 12/2003 | Yuan et al. |
| 6,677,009 | B2 | | 1/2004 | Boyd et al. |
| 6,703,086 | B2 | | 3/2004 | Kronzer et al. |
| 6,723,773 | B2 | | 4/2004 | Williams et al. |
| 6,753,050 | B1 | | 6/2004 | Dalvey et al. |
| 6,786,994 | B2 | | 9/2004 | Williams et al. |
| 6,849,312 | B1 | | 2/2005 | Williams |
| 6,869,910 | B2 | | 3/2005 | Williams et al. |
| 6,871,950 | B2 | | 3/2005 | Higuma et al. |
| 6,875,487 | B1 | | 4/2005 | Williams et al. |
| 6,878,423 | B2 | | 4/2005 | Nakanishi |
| 6,884,311 | B1 | | 4/2005 | Dalvey et al. |
| 6,916,589 | B2 | | 7/2005 | Hare et al. |
| 6,916,751 | B1 | | 7/2005 | Kronzer |
| 6,951,671 | B2 | | 10/2005 | Mukherjee et al. |
| 6,998,211 | B2 | | 2/2006 | Riley et al. |
| 7,001,649 | B2 | | 2/2006 | Wagner et al. |
| 7,008,746 | B2 | | 3/2006 | Williams et al. |
| 7,021,666 | B2 | | 4/2006 | Hare |
| 7,022,385 | B1 | | 4/2006 | Nasser |
| 7,026,024 | B2 | | 4/2006 | Chang et al. |
| 7,081,324 | B1 | | 7/2006 | Hare et al. |
| 7,160,411 | B2 | | 1/2007 | Williams et al. |
| 7,220,705 | B2 | | 5/2007 | Hare |
| 7,238,410 | B2 | | 7/2007 | Kronzer |
| 7,361,247 | B2 | | 4/2008 | Kronzer |
| 7,364,636 | B2 | | 4/2008 | Kronzer |
| 2001/0051265 | A1 | | 12/2001 | Williams et al. |
| 2002/0025208 | A1 | | 2/2002 | Sato et al. |
| 2002/0048656 | A1 | | 4/2002 | Sato et al. |
| 2002/0192434 | A1 | | 12/2002 | Yuan et al. |
| 2003/0008112 | A1 | | 1/2003 | Cole et al. |
| 2003/0021962 | A1 | | 1/2003 | Mukherjee et al. |
| 2004/0100546 | A1 | | 5/2004 | Horvath |
| 2004/0146700 | A1 | | 7/2004 | Boyd et al. |
| 2005/0048230 | A1 | | 3/2005 | Dalvey et al. |
| 2007/0172609 | A1 | | 7/2007 | Williams |
| 2007/0172610 | A1 | | 7/2007 | Williams |
| 2007/0221317 | A1 | | 9/2007 | Knonzer et al. |
| 2007/0231509 | A1 | | 10/2007 | Xu et al. |
| 2008/0149263 | A1 | | 6/2008 | Dalvey et al. |
| 2008/0302473 | A1 | | 12/2008 | Dalvey et al. |
| 2008/0305253 | A1 | | 12/2008 | Dalvey et al. |
| 2008/0305288 | A1 | | 12/2008 | Dalvey et al. |

OTHER PUBLICATIONS

"U.S. Appl. No. 10/911,249 Response to Notice of Non–Compliant Amendment filed Jun. 2, 2005", 5 pgs.
"International Application No. PCT/US99/20823 International Preliminary Examination Report mailed Sep. 19, 2000", 14 pgs.
"International Application No. PCT/US99/20823 PCT Search Report mailed Dec. 13, 1999", 8 pgs.
"International Application No. PCT/US99/20823 PCT Written Opinion mailed May 16, 2000", 15 pgs.
"U.S. Appl. No. 12/034,932, Non–Final Office Action mailed Sep. 10, 2009", 5 pgs.
"U.S. Appl. No. 12/193,573, Non–Final Office Action mailed Sep. 11, 2009", 5 pgs.
"U.S. Appl. No. 12/193,578, Non–Final Office Action mailed Sep. 11, 2009", 5 pgs.
"U.S. Appl. No. 10/911,249, Final Office Action mailed Jun. 30, 2009", 5 pgs.
"U.S. Appl. No. 10/911,249, Response filed Nov. 30, 2009 to Non–Final Office Action mailed Sep. 21, 2009", 17 pgs.
"U.S. Appl. No. 12/193,562, Non–Final Office Action mailed Sep. 9, 2009", 5 Pgs.
"U.S. Appl. No. 12/193,562, Response filed Dec. 9, 2009 to Non–Final Office Action mailed Sep. 9, 2009", 17 pgs.
"U.S. Appl. No. 12/193,573, Response filed Jun. 15, 2009 to Non Final Office Action mailed Apr. 7, 2009", 19 pgs.
"U.S. Appl. No. 12/193,578, Response filed Jun. 15, 2009 to Non–Final Office Action mailed Feb. 11, 2009", 16 pgs.
"U.S. Appl. No. 10/911,249 Response filed Jan. 5, 2009 to Final Office Action mailed Dec. 5, 2008", 10 pgs.
"U.S. Appl. No. 10/911,249 Response filed Nov. 24, 2008 to Final Office Action mailed Oct. 22, 2008", 25 pgs.
"U.S. Appl. No. 10/911,249 Response filed Mar. 11, 2009 to Final Office Action mailed Feb. 9, 2009", 13 pgs.
"U.S. Appl. No. 12/193,573 Non–Final Office Action mailed Apr. 7, 2009", 11 pgs.
"U.S. Appl. No. 12/193,578 Non–Final Office Action mailed Feb. 11, 2009", 12 pgs.
"U.S. Appl. No. 12/218,260 Non–Final Office Action mailed Jan. 2, 2009", 11 pgs.
"U.S. Appl. No. 12/218,260 Response filed Apr. 2, 2009 to Non Final Office Action mailed Jan. 2, 2009", 7 pgs.
"U.S. Appl. No. 09/150,983, Notice of Allowance mailed Nov. 19, 2002", 8 pgs.
"U.S. Appl. No. 09/150,983, Response to Non–Final Office Action filed Aug. 7, 2002", 9 pgs.
"U.S. Appl. No. 09/541,845, Final Office Action mailed Nov. 25, 2003", 4 pgs.
"U.S. Appl. No. 09/541,845, Non–Final Office Action mailed Apr. 16, 2003", 4 pgs.
"U.S. Appl. No. 09/541,845, Notice of Allowance mailed May 4, 2004", 4 pgs.
"U.S. Appl. No. 09/541,845, Response filed Mar. 23, 2004 to Final Office Action mailed Nov. 25, 2003", 6 pgs.
"U.S. Appl. No. 09/541,845, Response filed Jul. 15, 2003 to Non–Final Office Action mailed Apr. 14, 2003", 5 pgs.
"U.S. Appl. No. 09/541,845, Supplemental Notice of Allowability mailed Jan. 26, 2005", 2 pgs.
"U.S. Appl. No. 09/661,532, Final Office Action mailed May 20, 2003", 8 pgs.
"U.S. Appl. No. 09/661,532, Non–Final Office Action mailed Mar. 1, 2002", 9 pgs.
"U.S. Appl. No. 09/661,532, Notice of Allowance mailed Feb. 12, 2004", 4 pgs.
"U.S. Appl. No. 09/661,532, Response filed Aug. 20, 2003 to Final Office Action mailed May 20, 2003", 5 pgs.
"U.S. Appl. No. 09/661,532, Response filed Aug. 30, 2002 to Non–Final Office Action mailed Mar. 1, 2002", 8 pgs.
"U.S. Appl. No. 10/719,220, Non–Final Office Action mailed Sep. 9, 2004", 3 pgs.
"U.S. Appl. No. 10/719,220, Preliminary Amendment filed Nov. 21, 2003", 3 pgs.
"U.S. Appl. No. 10/911,249, Response filed Jul. 29, 2008 to Final Office Action mailed Jan. 29, 2008", 19 pgs.
"U.S. Appl. No. 10/911,249, Preliminary Amendment mailed Jun. 4, 2004", 4 pgs.
"U.S. Appl. No. 10/911,249, Response filed Jul. 11, 2007 to Non–Final Office Action Mar. 13, 2007", 11 pgs.
"U.S. Appl. No. 10/911,249, Final Office Action mailed Jan. 29, 2008", 6 pgs.
"U.S. Appl. No. 10/911,249 Notice of Allowance mailed Mar. 25, 2008", 4 pgs.
"U.S. Appl. No. 10/911,249 Response to Final Office Action filed Feb. 18, 2008", 7 pgs.
"U.S. Appl. No. 10/911,249 Response filed Dec. 14, 2007 to Office Action mailed Sep. 20, 2007", 9 pgs.
"International Application Serial No. PCT/US00/24633, International Search Report mailed Nov. 30, 2000", 7 pgs.
"U.S. Appl. No. 09/150,983 Notice of Allowance Nov. 19, 2002", 8 pgs.
"U.S. Appl. No. 09/150,983 Response to Non–Final Office Action Aug. 7, 2002", 13 pgs.
"U.S. Appl. No. 09/150,983 Final Office Action Aug. 2, 2000", 10 pgs.
"U.S. Appl. No. 09/150,983 Non–Final Office Action Jan. 30, 2001", 7 pgs.
"U.S Appl. No. 09/150,983 Non–Final Office Action Dec. 28. 1999", 7 pgs.
"U.S. Appl. No. 09/150,983 Non–Final Office Action Apr. 11, 2000", 6 pgs.
"U.S. Appl. No. 09/150,983 Response to Non–Final Office Action Feb. 16, 2000", 8 pgs.
"U.S. Appl. No. 09/150,983 Response to Non–Final Office Action Jun. 20, 2000", 9 pgs.
"U.S. Appl. No. 09/535,937 Notice of Allowance Sep. 10, 2002", 9 pgs.
"U.S. Appl. No. 09/535,937 Non–Final Office Action Nov. 29, 2001", 10 pgs.
"U.S. Appl. No. 09/535,937 Response to Non–Final Office Action May 28, 2002", 9 pgs.
"U.S. Appl. No. 10/911,249 Final Office Action filed Dec. 14, 2006", 3 pgs.
"U.S. Appl. No. 10/911,249 Final Office Action filed Dec. 8, 2006", 3 pgs.
"U.S .Appl. No. 10/911,249 Final Office Action filed Jul. 26, 2005", 3 pgs.
"U.S. Appl. No. 10/911,249 Non–Final Office Action filed Feb. 8, 2005", 5 pgs.
"U.S. Appl. No. 10/911,249 Non–Final Office Action filed Mar. 13, 2007", 4 pgs.
"U.S. Appl. No. 10/911,249 Non–Final Office Action mailed Sep. 20, 2007", OARN,5 pgs.

* cited by examiner

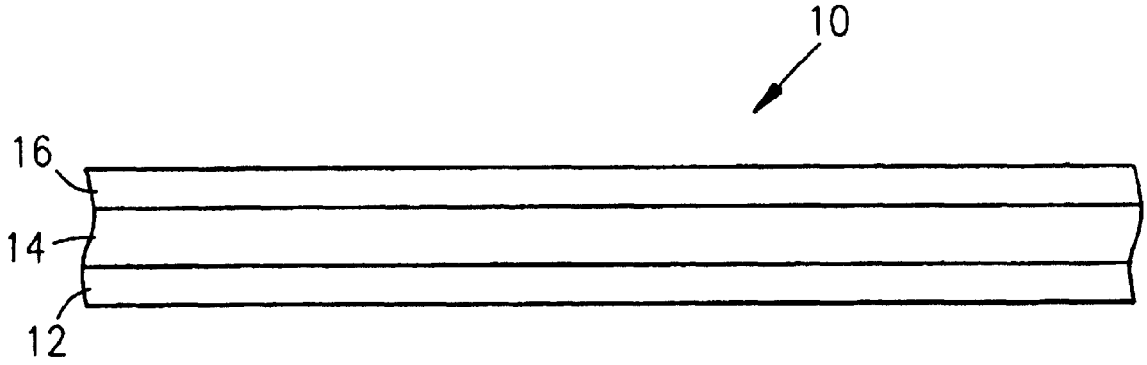
10
16
14
12

IMAGE TRANSFER SHEET

Matter enclosed in heavy brackets [ ] appears in the original patent but forms no part of this reissue specification; matter printed in italics indicates the additions made by reissue.

BACKGROUND OF THE INVENTION

The present invention relates to an image transfer sheet and to a method for making the image transfer sheet.

Image transfer to articles made from materials such as fabric, nylon, plastics and the like has increased in popularity over the past decade due to innovations in image development. On Feb. 5, 1974, La Perre et al. had issue a United States Patent describing a transfer sheet material markable with uniform indicia and applicable to book covers. This sheet material included adhered plies of an ink-receptive printable layer and a solvent-free, heat-activatable adhesive layer. The adhesive layer was somewhat tacky prior to heat activation to facilitate positioning of a composite sheet material on a substrate which was to be bonded. The printable layer had a thickness of 10–500 microns and had an exposed porous surface of thermoplastic polymeric material at least 10 microns thick.

Indicia were applied to the printable layer with a conventional typewriter. A thin film of temperature-resistant, low surface energy polymer, such as polytetrafluoroethylene, was laid over the printed surface and heated with an iron. Heating caused the polymer in the printable layer to fuse thereby sealing the indicia into the printable layer.

On Sep. 23, 1980, Hare had issue U.S. Pat. No. 4,224,358, which described a kit for applying a colored emblem to a t-shirt. The kit comprised a transfer sheet which included the outline of a mirror image of a message. To utilize the kit, a user applied a colored crayon to the transfer sheet and positioned the transfer sheet on a t-shirt. A heated instrument was applied to the reverse side of the transfer sheet in order to transfer the colored message.

The Greenman et al. patent, U.S. Pat. No. 4,235,657, issuing Nov. 25, 1980, described a transfer web for a hot melt transfer of graphic patterns onto natural, synthetic fabrics. The transfer web included a flexible substrate coated with a first polymer film layer and a second polymer film layer. The first polymer film layer was made with a vinyl resin and a polyethylene wax which were blended together in a solvent or liquid solution. The first film layer served as a releasable or separable layer during heat transfer. The second polymeric film layer was an ionomer in an aqueous dispersion. An ink composition was applied to a top surface of the second film layer. Application of heat released the first film layer from the substrate while activating the adhesive property of the second film layer thereby transferring the printed pattern and a major part of the first layer along with the second film layer onto the work piece. The second film layer bonded the printed pattern to the work piece while serving as a protective layer for the pattern.

The Sanders et al. patent, U.S. Pat. No. 4,399,209, issuing Aug. 16, 1983, describes an imaging system in which images were formed by exposing a photosensitive encapsulate to actinic radiation and rupturing the capsules in the presence of a developer so that there was a pattern reaction of a chromogenic material present in the encapsulate or co-deposited on a support with the encapsulate and the developer which yielded an image.

The Goffi patent, U.S. Pat. No. 4,880,678, issuing Nov. 14, 1989, describes a dry transfer sheet that comprises a colored film adhering to a backing sheet with an interposition of a layer of release varnish. The colored film included 30%–40% pigment, 1%–4% of cycloaliphatic epoxy resin, from 15%–35% of vinyl copolymer and from 1%–4% of polyethylene wax. This particular printing process was described as being suitable for transferring an image to a panel of wood.

The Kronzer et al. patent, U.S. Pat. No. 5,271,990, issuing Dec. 21, 1993, describes an image-receptive heat transfer paper that included a flexible paper based web base sheet and an image-receptive melt transfer film that overlaid a top surface of the base sheet. The image-receptive melt transfer film was comprised of a thermoplastic polymer melting at a temperature within a range of 65°–180° C.

The Higashiyami et al. patent, U.S. Pat. No. 5,019,475, issuing May 28, 1991, describes a recording medium that included a base sheet, a thermoplastic resin layer formed on at least one side of the base sheet and a color developer layer formed on a thermoplastic resin layer and capable of color development by reaction with a dye precursor.

DESCRIPTION OF THE DRAWINGS

FIG. 1 illustrates a cross-sectional view of one embodiment of the image transfer sheet of the present invention.

SUMMARY OF THE INVENTION

One embodiment of the present invention includes a method for transferring an image from one substrate to another. The method comprises providing an image transfer sheet which is comprised of a substrate layer, a release layer and an image-imparting layer that comprises a polymer component such as a low density polyethylene (LDPE) or Ethylene Acrylic Acid (EAA) or Ethylene Vinyl Acetate (EVA) or Methane Acrylic Ethylene Acrylic (MAEA) or mixtures of these materials, each having a melt index within a range of 20–1,200 C-g/10 minute (SI). An image is imparted to the polymer component of the image imparting layer through an image imparting medium such as ink or toner.

In one embodiment, an image-receiving substrate is also provided. The image-receiving substrate is contacted to the image transfer sheet and is specifically contacted to the polymer component of the image imparting layer. Heat is applied to the substrate layer of the image transfer sheet and is transferred to the polymer component of the image imparting layer so that the polymer, such as the LDPE, EAA, or EVA or MAEA encapsulates the image-imparting medium and transfers the encapsulates to the image-receiving substrate thereby forming a mirror image on the image-receiving substrate.

One other embodiment of the present invention includes an image transfer sheet that comprises a substrate layer, a release layer and an image imparting layer that comprises a polymeric layer such as a low density polyethylene layer, an EAA layer, an EVA layer or an MAEA layer. An image receptive layer is a top polymer layer.

With one additional embodiment, an image transfer sheet of the present invention comprises an image imparting layer but is free from an image receptive layer such as an ink receptive layer. Image indicia are imparted, with this embodiment, with techniques such as color copy, laser techniques, toner or by thermo transfer from ribbon wax or from resin.

The LDPE polymer of the image imparting layer melts at a point within a range of 43°–300° C. The LDPE has a melt index (MI) of 60–1,200 SI-g/10 minute.

The EAA has an acrylic acid concentration ranging from 5 to 25% by weight and has an MI of 20 to 1300 g/10 minutes. A preferred EAA embodiment has an acrylic acid concentration of 7 to 20% by weight and an MI range of 20 to 700.

The EVA has a MI within a range of 20 to 2300. The EVA has a vinyl acetate concentration ranging from 10 to 30% by weight.

The present invention further includes a kit for image transfer. The kit comprises an image transfer sheet that is comprised of a substrate layer, a release layer and an image imparting layer made of a polymer such as LDPE, EAA, EVA, or MAEA or mixtures of these polymers that melt at a temperature within a range of 100°–700° C. The LDPE has a melt index of 60–1,200 (SI)-g/minute. The kit also includes a device for imparting an image-imparting medium to the polymer component of the image imparting layer of the image transfer sheet. One kit embodiment additionally includes an image-receiving substrate such as an ink receptive layer that is an element of the image transfer sheet.

DETAILED DESCRIPTION OF PREFERRED EMBODIMENTS

One embodiment of the present invention, an image transfer sheet, illustrated generally at 10 in FIG. 1, is comprised of a substrate layer 12, a release layer 14 comprising a silicone coating and a peel layer that together have a thickness of about 3 to 8 mils, also known as an image imparting layer 16, comprising a polymer component selected from one or more of a low density polyethylene (LDPE), ethylene acrylic acid (EAA), ethylene vinyl acetate (EVA), or methane acrylic ethylene acetate (M/EAA), having a melt index of 20–1200 (SI) g/10 minute and a polymer thickness of 0.7 to 2.3 mils of polymer or (20 g/m$^2$ to 50 g/m$^2$ with a melting point range of 40°–450° C.), whereby the release layer 14 is sandwiched between the substrate layer 12 and the peel layer 16 comprising a polymeric material such as LDPE, EAA, EVA or M/EAA.

Another embodiment of the present invention also includes a method for transferring an image from one substrate to another. The method comprises a step of providing an image transfer sheet 10 that is comprised of a substrate or base layer 12, such as box paper with a base weight of 75 g/m$^2$ to 162 g/m$^2$, a release layer 14, comprising a silicone coating and a peel layer 16 that includes one or more of the polymers LDPE, EAA, EVA, or M/EAA at a thickness of about 1.5 mils and having a melt index, MI, within a range of 60°–1300° C. Next, an image is imparted to the polymer component of the peel layer 16 utilizing a top coating image-imparting material such as ink or toner. The ink or toner may be applied utilizing any conventional method such as an ink jet printer or an ink pen or color copy or a laser printer. The ink may be comprised of any conventional ink formulation. An ink jet coating is preferred.

The image transfer sheet 10 is, in one embodiment, applied to a second substrate, also called the image receiving substrate, so that the polymeric component of the peel layer 16 contacts the second substrate. The second substrate may be comprised of materials such as cloth, paper and other flexible or inflexible materials. Once the image transfer sheet 10 contacts the second substrate, a source of heat, such as an iron or other heat source, is applied to the image transfer sheet 10 and heat is transferred through the peel layer 16. The peel layer 16 transfers the image to the second substrate. The application of heat to the transfer sheet 10 results in ink or other image-imparting media within the polymeric component of the peel layer being changed in form to particles encapsulated by the polymeric substrate such as the LDPE, EAA, EVA or M/EAA immediately proximal to the ink or toner. The encapsulated ink particles or encapsulated toner particles are then transferred to the second substrate in a mirror image to the ink image or toner image on the polymeric component of the peel layer while the portion of the polymer of the peel layer 16 not contacting the ink or toner and encapsulating the ink or toner is retained on the image transfer sheet 10.

When image imparting media and techniques such as color copy, laser techniques, toner or thermo transfer from ribbon wax or resin are employed, it is not necessary to apply an image receiving layer to the image transfer sheet.

As used herein, the term "melt index" refers to the value obtained by performing ASTM D-1238 under conditions of temperature, applied load, timing interval and other operative variables which are specified therein for the particular polymer being tested.

It is believed that the addition of ink or toner to the image imparting layer, specifically, to the LDPE or to the EAA, EVA, or E/MAA polymeric component, locally lowers the melting point of the polymeric component material such as LDPE, EAA, EVA, or E/MAA which either contacts the ink or toner or is immediately adjacent to the ink or toner. Thus, an application of heat to the polymeric component of the peel layer 16 results in a change in viscosity of the low density polyethylene or other polymeric material contacted by the ink or toner and immediately adjacent to the ink or toner as compared to the surrounding polymeric media. It is believed that the polymeric component such as LDPE, EAA, EVA or E/MAA polyethylene locally melts with the ink or toner. However, as heat is removed and the area cools, the polymeric component solidifies and encapsulates the ink or toner. The solidification-encapsulation occurs substantially concurrently with transfer of the ink-LDPE or ink-EAA, ink-EVA or ink-E/MAA or other polymer mixture to the receiving substrate.

Because the polymeric component of the peel layer 16 generally has a high melting point, the application of heat, such as from an iron, does not result in melting of this layer or in a significant change in viscosity of the overall peel layer 16. The change in viscosity is confined to the polymeric component that actually contacts the ink or toner or is immediately adjacent to the ink or toner. As a consequence, a mixture of the polymeric component and ink or toner is transferred to the second substrate sheet as an encapsulate whereby the polymeric component encapsulates the ink or toner. It is believed that the image transfer sheet of the present invention is uniquely capable of both cold peel and hot peel with a very good performance for both types of peels.

One polymeric component, the low density polyethylene ethylene-acrylic acid (EAA) polymeric component, is formed as a product of the co-polymerization of ethylene and acrylic acid forming a polymer with carboxyl groups. The low density EAA polymer is more amorphous than low density polyethylene which causes the EAA to decrease in melting point as compared to LDPE. The carboxyl groups of the acrylic acid group of EAA also provide chemical functional groups for hydrogen bonding.

In one preferred EAA polymer embodiment, acrylic acids are present in a concentration of 5 to 25% by weight of the EAA formulation. The EAA has a melt index ranging from 20 to 1200. The most preferred EAA formulation has an acrylic acid concentration of 10 to 20% by weight. This EAA embodiment has a MI of 60 to 500.

Other polymeric materials that may be used include an ethylene melt with acrylic acid copolymer resin and with a melt flow index ranging from 20–1,500 DS/minute and preferably having a melt flow index of 50–100 DS/minute. This ethylene-acrylic acid polymer melt, known as E/MAA along with ethylene acrylic acid, EAA, ethylene vinyl acetate (EVA) with acetate percentages ranging from 4%–30% and preferably 11%–20% may be used as the polymer in the peel layer 16. One other preferred E/MAA embodiment has a MI of 60 to 600. One preferred embodiment of E/MAA and EAA includes an acid content within a concentration range of 4 to 25%.

One other polymeric material that may be used is EVA with Vinyl Acetate contents. This polymer has a MI of 100 to 2300. The vinyl acetate contents range from approximately 10 to 30% by weight. In one preferred embodiment, the EVA includes vinyl acetate contents of 10% to 28%, with a melt index within a range of 10 to 600. In one other preferred embodiment, the EVA has an MI within a range of 20 to 600. It is also contemplated that a polyethylene copolymer dispersion may be suitable for use in this layer.

The melt flow indices of these polymer components range from 100 DS/minute to 2,500 DS/minute with a preferable range of 20–700 DS/minute. Each of these polymeric components, in addition to a Surlyninoma resin are usable with or without additives, such as slip additives, UV absorbents, optical brighteners, pigments, antistatics and other additives conventionally added to this type of polymer. All of these polymeric components have softening points within a range of 40°–300° C.

The sheet and method of the present invention accomplish with a simple elegance what other methods and transfer sheets have attempted to accomplish with a great deal of complexity. The sheet and method of the present invention do not require complicated coloring or image-generating systems such as preformed encapsulates. The image transfer sheet and method, furthermore, do not require complicated layer interaction in order to transfer a stable image to an image-receiving substrate. The image transfer sheet of the present invention merely requires a user to impart an image to the polymeric component of the peel or image imparting layer with a material such as ink or toner. In one embodiment, once the image is transferred, the user contacts the peel layer 16 to the second or receiving substrate and applies a source of heat such as an iron. The capacity of the polymeric component of the peel layer to encapsulate an image-imparting media such as ink or toner renders this image transfer sheet exceedingly versatile.

The substrate layer 12 of the image transfer sheet 10 is preferably made of paper but may be made of any flexible or inflexible material ranging from fabric to polypropylene. Specific substrate materials include polyester film, polypropylene, or other film having a matte or glossy finish. In one embodiment, the substrate is a base paper having a weight-to-surface area within a range of 60 g/m$^2$ to 245 g/m$^2$ and preferably a range of 80 g/m$^2$ to 145 g/m$^2$. The substrate has a thickness that falls within a range of 2.2–12.0 mils and a preferred thickness of 3–8.0 mils, as measured in a Tappi 411 test procedure.

The substrate layer may be coated with clay on one side or both sides. The substrate layer may be resin coated or may be free of coating if the substrate is smooth enough. In one embodiment, overlying the substrate is a silicone coating. The silicone coating has a range of thickness of 0.1 to 2.0 mils with a preferred thickness range of 0.1 to 0.7 mils. The silicone coating has a release in g/inch within a range of 50 to 1100 and a preferred release of 65 to 800 g/inch as measured by a Tappi-410 method. Other release coatings such as fluoro carbon, urethane, or acrylic base polymer may be used.

The silicone-coated layer acts as a release-enhancing layer. It is believed that when heat is applied to the image transfer sheet, thereby encapsulating the image-imparting media such as ink or toner with low density polyethylene, Ethylene Acrylic Acid (EAA), Ethylene Vinyl Acetate (EVA) or Methane Acrylic Ethylene Acrylic (MAEA), or mixtures of these materials, local changes in temperature and fluidity of the low density polyethylene or other polymeric material occurs. These local changes are transmitted into the silicone-coated release layer and result in local, preferential release of the low density polyethylene encapsulates.

This local release facilitates transfer of a "clean" image from the image transfer sheet to the final substrate. By "clean" image is meant an image with a smooth definition.

The silicone-coated release layer is an optional layer that may be eliminated if the image-receiving surface 17 of the peel layer 16 is sufficiently smooth to receive the image. In instances where a silicone-coated release layer is employed, a silicone-coated paper with silicone deposited at 0.32–2.43 g/m$^2$ is employed. The silicone-coated paper preferably has a release value between 50 g/in. and 700 g/in. The paper may be coated on a backside for curl control or other function, printability or heat stabilities.

A top surface of the silicone may be treated with a corona treatment or chemical treatment prior to application of the polymeric component or on top of the polymer in order to provide better adhesion or to improve washability of the image transferred.

One desirable quality of the polymeric component, LDPE, EVA, EAA or M/EAA, is that it has a capacity to coat any fibers or other types of discontinuities on the image-receiving substrate and to solidify about these fibers or discontinuities. This coating and solidification on fibers or any other type of discontinuity in the receiving substrate aids in imparting a permanency to the final, transferred image. Because the image-generated media, such as ink or toner, is actually encapsulated in the low density polyethylene or other polymeric component material, the image transferred along with the LDPE, EVA, EAA or M/EAA, is a permanent image that cannot be washed away or removed with conventional physical or chemical perturbations such as machine washing. The polymeric materials LDPE, EVA, EAA, or M/EAA are relatively inert to chemical perturbations. In one embodiment, the LDPE, EVA, EAA, or M/EAA is applied to either the substrate or the release layer 14 in a thickness within a range of 0.5 mils to 2.8 mils or 10 g/m$^2$ to 55 g/m$^2$ and preferably 22 g/m$^2$ to 48 g/m$^2$.

Overlying the polymeric component containing peel layer 16 is a prime layer GAT with polyethylene dispersion or an EAA or EVA dispersion. This layer has a high melting index within a range of 200–2,000. The EAA emulsion dispersion has an MI of 200–2000 and has an acrylic acid concentration of 7%–25% by weight. The EVA dispersion has an MI of 200–2500 and an acetate or other acrylic polymer concentration of 7%–33% by weight.

A fifth layer is an ink jet coating receptor layer having a thickness of 3 g/m$^2$ to 30 g/m$^2$. Overlying the ink jet coating receptor layer is an ink jet top coating layer having a thickness of 4 g/m$^2$–30 g/m$^2$. In one embodiment, the ink jet coating receptor layer and ink jet top coating layer are combined to create a single layer having a heavier coat weight.

This layer is not required when image imparting techniques such as color copy, laser, loner, or thermo transfer from ribbon wax or resin are employed.

In one embodiment, the image transfer sheet of the present invention is made by applying a low density polyethylene, or a low density polyethylene ethylene acrylic acid or an ethylene vinyl acetate (10%–28%) of vinyl acetate to the substrate utilizing a process such as extrusion, hot melt, slot die, or a "roll on" process or other similar process.

The low density polyethylene preferably has a melt index within a range of 20–1,200 g/10 minutes and most preferably a melt index of 100–700-g/minute. An acceptable melt flow rate measured at 125 degrees Centigrade and 325 grams falls within a range of 7–30 g/10 min. with a preferred range of 8–20 g/10 min. as measured by ASTM Test Method D-1238. An Equivalent Melt Index, EMI, which is equal to 66.8×(Melt Flow Rate at 125 C, 325 grams) 0.83, may acceptably range from 30–2000 g/10 min. and preferably ranges from 200–800 g/10 min. The Melting Point, Tm, ranges from 43 to 250 degrees Centigrade with a preferred range of 65 to 150 degrees Centigrade as measured in ASTM Test Method D-3417. The Vicat Softening Point of the LDPE ranges from 43 to 150 degrees Centigrade as measured by ASTM Test Method D-1525.

The ethylene vinyl acetate (EVA) has a melt index of 200–2500 dg/minute with a preferred index range of 200 to 1200 dg/min. The Ring and Ball Softening Point ranges from 67 to 200 degrees C., with a preferred range of 76 to 150 degrees C. The percent vinyl acetate in the EVA is within a range of 5 to 33% and preferably within a range of 10–33%. The metoacrylic acid or ethylene acrylic acid also known as Nucryl™ has a concentration of about 4%–20% acrylic acid and a melt index within a range of 50–1,300-g/minute. The preferable range is 200–600-g/minute.

The EAA/EMAA has a Melt Index of 20–1300 dg/min. with a preferred range of 60–700 dg/min. as measured in ASTM Test Method D-1238. The Vicat Softening Point ranges from 43–225 degrees Centigrade with a preferred range of 43–150 degrees Centigrade as measured by ASTM Test 43–150 degrees Centigrade. The EAA/EMAA has a percent acrylic acid concentration within a range of 5–25 percent with a preferred range of 7–22 percent by weight. The Melt Flow Rate ranges from 7–90 g/10 min. with a preferred range of 7–65 g/10 min. as measured by ASTM test method D-1238.

Twenty-eight g/m$^2$ to 50 g/m$^2$ are applied to a substrate. The application thickness of one of the LDPE, EAA, EVA or Nucryl™ is 1 to 2 mils in thickness. The most preferred range of thickness of 1.0–2.2 mils.

In one embodiment, the polymeric components of LDPE, EAA, EVA or Nucryl™ is applied to a silicone-release coated paper. The silicone-release coating is applied to paper or film to basis WT 80 g/m$^2$ an application quantity of 80 g/m$^2$ to 200 g/m$^2$ and preferably at a rate of 95 g/m$^2$ to 170 g/m$^2$.

Application of the polymeric component to the substrate, such as release coated paper, may be by extrusion, roll coater, any coating process, slot-die or hot melt extrusion. Other acceptable methods of application include an air knife or rod blade application. The polymeric component may be prime coated with a corona treatment or chemical treatment with acrylic acid emulsion having a melt index of 300–2,000-g/min., or an EVA emulsion, chemical primer or corona treatment or may be eliminated if chemical treatment for adhesion was applied. A top coat may be applied over the polymeric component. The final application is an ink jet coating of two or three passes to deposit 4 g/m$^2$ to 30 g/m$^2$ depending on particular printing applications.

One embodiment of the image transfer sheet is described in Table 1 with respect to layer identity, interlayer relationship and rate of application of each layer.

TABLE 1

| Layer Type | Applications in G/M$^2$ | |
|---|---|---|
| Base paper | 70-160 | g/m2 layer barrier coating 3-10 (applied on one or both sides of the base paper) |
| Silicone coating (or other release coating) | 0.4-2 | lbs/300 SF |
| Corona treatment (may or may not be necessary) | | |
| Film or peel layer | 20-50 | |
| Corona treatment (or other chemical) | 1-5 | |
| Ink jet coating | 4-35 | (the ink jet coating could be applied in one, two, three, or additional passes) |

The film layer may be applied as a cold peel or as a hot peel.

Presented herein is one example of one preferred embodiment of the image transfer sheet of the present invention. This example is presented to illustrate particular layers and particular specification for the layers and is not intended to limit the scope of the present invention.

EXAMPLE

In one embodiment, the image transfer sheet included a first substrate layer of base paper having a basis weight of 65 g/m$^2$ to 145 g/m$^2$ and preferably falling within a range of 97 g/m$^2$ to 138 g/m$^2$. While paper is described, it is contemplated that materials such as polyester film, polypropylene or polyethylene or other film of 142–1,000 gauge matte or glossy finish may be employed. In instances where paper is used, the paper may be clay coated on one side, or both sides, or polymer coated.

Overlaying the base substrate paper layer was a release layer comprising silicone. Other acceptable release coatings include fluorocarbon or other acrylic, urethane release coatings and so on. The release layer had a release value ranging from 50 g/in. to 2,000 g/in. and preferably a range of 80 g/in. to 500 g/in. The release layer may be omitted if the base paper has a surface of sufficient smoothness.

A third layer which is a peel layer of the image transfer sheet includes a low density polyethylene or other polymer polyethylene applied at a thickness of 0.5 mils to 2.8 mils or 10 g/m$^2$ to 55 g/m$^2$ and preferably 22 g/m$^2$ to 48 g/m$^2$. Other acceptable materials for use in the third layer include acrylic acid of 5%–22% ethylene vinyl acetate, 10%–28% (EVA) with a melt index ranging from 30–2,000. In one preferred embodiment, the melt index was 60–500. In addition to the materials mentioned, the third layer may also be comprised of a polyethylene copolymer dispersion.

The LDPE or EVA or polyethylene copolymer dispersion is primed with GAT with a high melt index ranging from 200–2,000. A preferred range is 200–2,000. It is contemplated that this primer layer is optional.

A fifth layer is a first layer of ink jet coating receptor laid down in a concentration of 3 g/m$^2$ to 30 g/m$^2$.

A sixth layer which is a third ink jet top coating is laid down at a concentration of 4 g/m$^2$ to 15 g/m$^2$. It is possible that the ink jet top coating could be laid down in a single pass in order to make a single layer with a heavier coat weight.

Although the present invention has been described with reference to preferred embodiments, workers skilled in the art will recognize that changes may be made in form and detail without departing from the spirit and scope of the invention.

What is claimed is:

1. An image transfer sheet [capable of transferring an ink image to an image receiving material], comprising:

a *removable* substrate [layer] *comprising at least one of a base paper or film*;

[a release layer;]

*a peel member comprising* a polymer [layer] *component* having a melt index within a range of *about* 20 [to 1200] grams per 10 minutes *to about 2300 grams per 10 minutes, the polymer component including a portion configured to carry image indicia to be transferred;*

[wherein the release layer is positioned between the substrate layer and the polymer layer; and ink from an ink jet printer or an ink pen or a laser printer that forms an image on and in the polymer layer wherein the ink and polymer contacting the ink when the ink is applied to the polymer are transferred to the image receiving material without transfer of the entire polymer layer]

*a release-enhancing coating positioned such that a first coating surface is abutting the removable substrate and a second coating surface is abutting the peel member; and*

*an image-receptive member overlaying the peel member and configured to receive image-imparting media, forming the image indicia, from a copying or printing process, the image-receptive member including an ink jet coating receptor layer having a thickness ranging from about 3 grams/square meter to about 30 grams/square meter, and an ink jet top coating layer overlaying the ink jet coating receptor layer and having a thickness ranging from about 4 grams/square meter to about 30 grams/square meter;*

*wherein the peel member is removable from the release-enhancing coating when the peel member is in a heated state and when the peel member is in a cooled or ambient state, and*

*wherein the removable substrate is configured to transfer external heat, when applied, to one or both of the peel member or the image-receptive member sufficient to encapsulate the image indicia on an image-receiving substrate during an image transfer process.*

2. The image transfer sheet of claim 1 wherein the polymer [layer melts at a] *component portion includes a melting* temperature within a range of [60–700 C] *about 43° C. to about 700° C.*

[3. The sheet of claim 1 wherein the release layer is comprised of a silicone coating.]

4. The *image transfer* sheet of claim 1, wherein the [release layer comprises a silicone coating and a base paper, the layer having] *release-enhancing coating has* a thickness [of approximately 3.0–8.0] *ranging from about 0.1 mils to about 2* mils.

5. The *image transfer* sheet of claim [1] *28,* wherein the polymer [layer] *component portion* has a thickness [within a range of] *ranging from* about [1.0 to 2.2] *0.5 mils to about 2.8* mils.

6. The image transfer sheet of claim [2 and further including an image-imparting medium encapsulated within the polymer] *28, wherein the polymer component portion is configured to encapsulate image-imparting media, of the image indica, when heat is transferred through the peel member.*

[7. The image transfer sheet of claim 1 wherein the polymer layer comprises a low density polyethylene layer.]

[8. The image transfer sheet of claim 1 wherein the polymer layer comprises one or more of a low density polyethylene, ethylene vinyl acetate layer, or ethylene acrylic acid.]

9. The image transfer sheet of claim [1] *15,* wherein the polymer [comprises a vinyl acetate fraction or an acrylic acid fraction] *component portion includes ethylene vinyl acetate having a vinyl acetate concentration within a range of about 10% to about 30% by weight, or ethylene acrylic acid having an acrylic acid concentration within a range of about 5% to about 25% by weight.*

[10. An image transfer system comprising:

an article effective for receiving and retaining an image; and an image transfer sheet for transferring the image to the article without application of heat, the image transfer sheet comprising:

a substrate layer;

a release layer;

a polymer layer comprising one or more of a low density polyethylene, ethylene vinyl acetate, and ethylene acrylic acid, wherein the release layer is positioned between the substrate layer and the polymer layer; and ink from an ink jet printer or an ink pen or a laser printer that forms the image on and in the polymer layer wherein the image is transferred and adhered to the article without transfer of the entire polymer layer.]

*11. The image transfer sheet of claim 6, wherein the image-imparting media includes at least one of toner or ink.*

*12. The image transfer sheet of claim 6, wherein the polymer component portion is configured such that one or more portions of the polymer component portion contacting or adjacent the image-imparting media is configured to change viscosity when heat is transferred through the peel member.*

*13. An image transfer sheet, comprising:*

*a silicone-coated removable substrate, the removable substrate including a base paper or film and having a substrate surface abutting a silicone coating, the silicone coating having a thickness less than about 2 mils; and*

*a peel member overlaying, and peelable from, the silicone coating, the peel member including a polymer component portion configured to carry image indicia to be transferred,*

*wherein the removable substrate is configured to transfer external heat, when applied, to the peel member sufficient to encapsulate the image indicia on an image-receiving substrate during an image transfer process.*

*14. The image transfer sheet of claim 13, wherein the polymer component portion includes at least one of low density polyethylene, ethylene vinyl acetate, a copolymer of ethylene and acrylic acid, or ethylene acrylic acid.*

*15. The image transfer sheet of claim 13, wherein the polymer component portion includes a melt flow index within a range of about 100 DS/minute to about 2,500 DS/minute.*

*16. The image transfer sheet of claim 13, wherein a surface of the silicone coating abutting the peel member is one or both of corona treated or chemically treated prior to be overlaid with the peel member.*

*17. The image transfer sheet of claim 13, wherein the removable substrate, the silicone coating, and the peel member have a combined thickness ranging from about 3 mils to about 8 mils.*

*18. The image transfer sheet of claim 13, wherein the silicone coating has a release value less than about 1100 grams/inch.*

*19. The image transfer sheet of claim 18, wherein the silicone coating has a release value ranging from about 50 grams/inch to about 700 grams/inch.*

*20. A kit comprising:*

*the image transfer sheet of claim 13; and*

*instructions for using the image transfer sheet.*

*21. A kit comprising:*

*the image transfer sheet of claim 13;*

*instructions for using the image transfer sheet; and*

*an image-receiving substrate configured to receive and retain image indicia transferred from the image transfer sheet.*

*22. The kit of claim 21, wherein the image-receiving substrate is a light-colored fabric.*

*23. The image transfer sheet of claim 13, comprising an image-receptive member overlaying the peel member, the image-receptive member configured to receive image-imparting media, forming the image indicia, from a copying or printing process.*

*24. A sheet, comprising:*

*a substrate member comprising at least one of a base paper or film and having a basis weight less than about 245 grams/square meter; and*

*a release-enhancing coating overlaying and abutting a surface of the substrate member, the release-enhancing coating having a release value less than about 2,000 grams/inch;*

*a peel member overlaying the release-enhancing coating and having a portion configured to carry image indicia to be transferred, the peel member including at least one of low density polyethylene, ethylene vinyl acetate, a copolymer of ethylene and acrylic acid, or ethylene acrylic acid;*

*a primer layer overlaying the peel member, the primer layer having a melt index ranging from about 200 grams per 10 minutes to about 2,000 grams per 10 minutes;*

*an ink jet coating receptor layer overlaying the primer layer, the ink jet coating receptor layer having a thickness ranging from about 3 grams/square meter to about 30 grams/square meter; and*

*an ink jet top coating layer overlaying the ink jet coating receptor layer having a thickness ranging from about 4 grams/square meter to about 30 grams/square meter,*

*wherein the substrate member is configured to transfer external heat, when applied, to one or more of the peel member, the primer layer, the ink jet coating layer or the ink jet top coating layer sufficient to encapsulate the image indicia on an image-receiving substrate during an image transfer process.*

* * * * *

UNITED STATES PATENT AND TRADEMARK OFFICE

CERTIFICATE OF CORRECTION

PATENT NO. : RE42,541 E
APPLICATION NO. : 11/054717
DATED : July 12, 2011
INVENTOR(S) : Jody A. Dalvey et al.

It is certified that error appears in the above-identified patent and that said Letters Patent is hereby corrected as shown below:

In column 9, line 48, in Claim 2, delete "claim 1" and insert -- claim [1] *28*, --, therefor.

Signed and Sealed this
Nineteenth Day of March, 2013

Teresa Stanek Rea

Teresa Stanek Rea
*Acting Director of the United States Patent and Trademark Office*